(12) United States Patent
Efraty

(10) Patent No.: US 8,669,671 B2
(45) Date of Patent: Mar. 11, 2014

(54) HYDRAULIC WIND FARMS FOR GRID ELECTRICITY AND DESALINATION

(75) Inventor: Avi Efraty, Har Adar (IL)

(73) Assignee: Avi Efraty, Har Adar (IL)

( * ) Notice: Subject to any disclaimer, the term of this patent is extended or adjusted under 35 U.S.C. 154(b) by 459 days.

(21) Appl. No.: 12/918,060

(22) PCT Filed: Feb. 26, 2009

(86) PCT No.: PCT/IL2009/000217
§ 371 (c)(1),
(2), (4) Date: Aug. 18, 2010

(87) PCT Pub. No.: WO2009/107132
PCT Pub. Date: Sep. 3, 2009

(65) Prior Publication Data
US 2010/0320772 A1    Dec. 23, 2010

(30) Foreign Application Priority Data

Feb. 26, 2008 (IL) .......................................... 189765

(51) Int. Cl.
*H02P 9/04* (2006.01)

(52) U.S. Cl.
USPC .......................................................... 290/55

(58) Field of Classification Search
USPC .................................................. 290/44, 55
See application file for complete search history.

(56) References Cited

U.S. PATENT DOCUMENTS

| 2,539,862 | A |  | 1/1951 | Rushing |
| 4,274,010 | A |  | 6/1981 | Lawson et al. |
| 4,280,061 | A |  | 7/1981 | Lawson et al. |
| 4,496,846 | A |  | 1/1985 | Perkins |
| 4,496,847 | A | * | 1/1985 | Parkins .......................... 290/44 |
| 4,498,017 | A |  | 2/1985 | Perkins |
| 4,503,673 | A | * | 3/1985 | Schachle et al. ................ 60/398 |
| 4,792,700 | A |  | 12/1988 | Ammons |
| 5,140,170 | A | * | 8/1992 | Henderson ...................... 290/44 |
| 6,107,203 | A | * | 8/2000 | Vanell ........................... 438/692 |
| 6,320,273 | B1 | * | 11/2001 | Nemec ........................... 290/55 |
| 6,861,766 | B2 |  | 3/2005 | Rembert |
| 6,911,743 | B2 | * | 6/2005 | Ishizaki ......................... 290/55 |
| 7,460,936 | B2 | * | 12/2008 | Fulks et al. ..................... 701/36 |
| 7,485,979 | B1 | * | 2/2009 | Staalesen ....................... 290/44 |
| 7,569,943 | B2 | * | 8/2009 | Kovach et al. .................. 290/44 |
| 7,656,055 | B2 | * | 2/2010 | Torres et al. .................... 290/55 |

(Continued)

FOREIGN PATENT DOCUMENTS

| WO | WO2004/079185 | 9/2004 |
| WO | WO2009/107132 | 9/2009 |

*Primary Examiner* — Tulsidas C Patel
*Assistant Examiner* — Viet Nguyen
(74) *Attorney, Agent, or Firm* — Soroker-Agman

(57) ABSTRACT

Pressurized hydraulic flow created in wind farms with wind driven pumps (wind-pumps) used for rated electric power production by means of hydraulic motors, or turbines, of constant speed and variable torque which actuate alternately and/or simultaneously rated electric generators as function of wind power availability. Use of positive displacement pumps driven by rotors of fixed pitch blades for maximum capture of wind power enables the attainment tip-speed-ratio of rotors in the range of high power coefficient by means of the pressurized hydraulic flow of the wind farms. Another application of wind farms with wind driven pumps is for the creation of variable hydraulic flow of fixed pressure as function wind power availability which may be used for water elevation as well as for the desalination of salt water solutions by reverse osmosis.

7 Claims, 8 Drawing Sheets

(56) References Cited

U.S. PATENT DOCUMENTS

| | | | |
|---|---|---|---|
| 8,026,625 B2* | 9/2011 | Jones et al. | 290/54 |
| 2006/0210406 A1* | 9/2006 | Harvey et al. | 417/334 |
| 2006/0260311 A1 | 11/2006 | Ingersol | |
| 2007/0024058 A1* | 2/2007 | McClintic | 290/44 |
| 2007/0029255 A1 | 2/2007 | D'Amato et al. | |
| 2007/0216164 A1 | 9/2007 | Rivas et al. | |
| 2007/0235383 A1 | 10/2007 | Krokoszinski | |
| 2008/0001408 A1 | 1/2008 | Liu et al. | |
| 2008/0030027 A1 | 2/2008 | Erdman | |
| 2009/0129953 A1* | 5/2009 | Andersen | 417/334 |
| 2009/0230688 A1* | 9/2009 | Torres et al. | 290/55 |
| 2010/0056315 A1* | 3/2010 | Scholte-Wassink | 475/159 |

* cited by examiner

HYDRAULIC WIND FARMS FOR GRID ELECTRICITY AND DESALINATION

BACKGROUND OF THE INVENTION

The present invention relates to apparatus, systems and methods for the harnessing of wind power using wind-driven hydraulic pump (wind-pump) units to provide pressurized hydraulic flow for continuous generation of rated electric power and/or for desalination of salt water solutions by reverse osmosis and/or for membrane filter separation of particulate matter from suspensions and/or for pressurizing water supply lines.

Wind power is a natural widespread source of renewable clean energy available everywhere, day and night, with variable wind velocity and intensity. The wide spread, efficient and economical harnessing of wind power is of increasing important for the combat of the global "green-house effect" which is the result of extensive and excessive combustion of fusil fuels for electric power generation, for the running of automobiles and for diverse industrial applications.

Wind power availability of a typical wind driven rotor is expressed by (1); wherein, $P_w$ (kW) stands for wind power, R (m) for rotor radius, d (g/ml) for wind density, v (m/sec) for wind velocity, and $\mu$ for a power coefficient with a maximum theoretical value of $16/27$ (0.592). The wind power equation takes the form expressed in (2) by assuming wind density of 1,200 g/m³. The tip-speed-ratio ($\lambda$) of a wind-driven rotor is expressed by (3); wherein, N (rpm) stands for the speed of rotor, and the attainment of a high power coefficient operation (e.g., $\mu$ of 0.40-0.55) is conditioned with such ratio maintained in a confined range (e.g., 5-11).

$$P_w = \mu(½)d(\pi R^2)v^3 \quad (1)$$

$$P_w = 6.0 \times 10^{-4} \mu(\pi R^2)v^3 \quad (2)$$

$$\lambda = [(2\pi RN)/60]/v \quad (3)$$

Direct production of electric power from wind by conventional techniques is done by means of self-sustained units mounted on top of tall towers at considerable height above ground level, each comprises; a vertical rotor with pitch controlled blades, an electric generator linked to the shaft of the rotor by means of a gearbox mechanism, and a wind tracking system. The installed power of a wind-driven generator becomes rated at speed of rotor induced at the nominal wind velocity, and this speed is maintained thereafter by means of a pitch control mechanism. Advanced wind turbines for rated electric power production may contain in their hubs several generators of alternating and/or simultaneous actuation modes by means of intricate transmission systems, as well as electronic rectifiers and inverters that enable the production of improved quality electric power before the rotor experiences its designed rated speed.

Indirect production and/or storage of electric power from wind through intricate hydraulic transmissions of various configurations were proposed by Lawson et al. in the U.S. Pat. Nos. 4,274,010 and 4,280,061; by Rushing in U.S. Pat. No. 2,539,862; by Ammons in U.S. Pat. No. 4,792,700; by Perkins in the U.S. Pat. Nos. 4,496,846; 4,496,847 and 4,498, 017; by Rembert in U.S. Pat. No. 6,861,766; and by Galayda Stephen and Michel in the PCT publication WO 2004/079185 A2, as well as by others.

The present invention describes apparatus, systems and methods for continuous and efficient harnessing of wind power in wind farms by simple hydraulic means which apply for rated electric power generation or for desalination by reverse osmosis or for membrane filtration or for pressurizing water supply/delivery lines.

SUMMARY OF THE INVENTION

The present invention describes apparatus, systems and methods for the harnessing of wind power in wind farms comprising wind-driven pressurizing devices (wind-pump) units, whereby created pressurized hydraulic flow is used for rated electric power production by means of hydraulic motors, or turbines, of constant speed and variable torque which actuate alternately and/or simultaneously rated electric generators as function of wind power availability. The rotors of said wind-pump units are of fixed pitch blades for maximum capture of wind power and the speed of rotors maintained in the tip-speed-ratio range of high power coefficient by using positive displacement water pumps as the pressurizing means combined with rotor-to-pump gearbox mechanism with the appropriate fixed transmission ratio. The constant speed motion of hydraulic motors, or turbines, whereby rated electric generators are actuated, is achieved using variable hydraulic flow devices which are actuated in response to speed deviation from the desired rated speed of electric generators.

The present invention also describes the application of wind farms with wind-driven pressurizing devices for the desalination of salt water solutions by reveres osmosis (RO) under constant pressure and variable flow. In this instance, wind power of a wind farm is transformed to variable hydraulic flow of fixed pressure by means of pressure controlled variable flow devices, thereby, enable RO desalination under an appropriate desired fixed pressure with flow rate determined by wind power availability.

Other applications covered by this invention include wind power utilization for the pressurizing water supply/delivery lines as well as for membrane filter separation of suspended particles from such pressurized solutions.

DETAILED DESCRIPTION OF THE INVENTION

Figure 1:
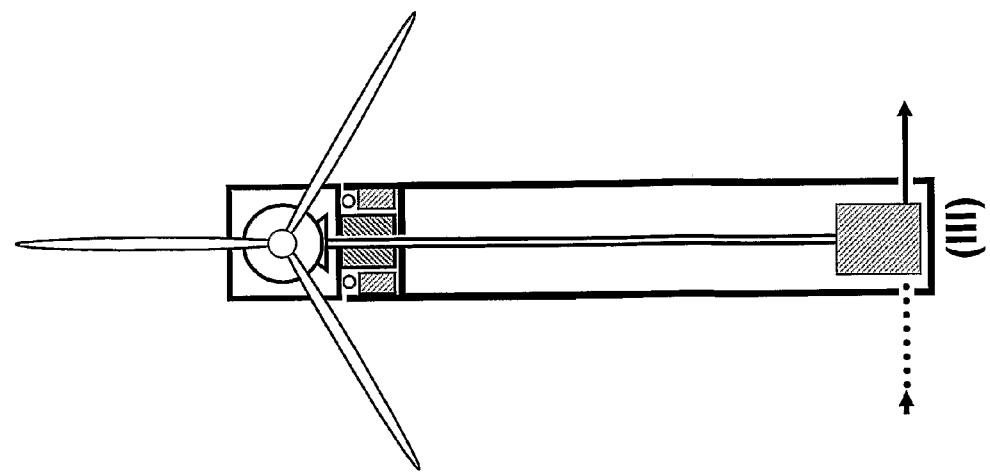
FIG. 1 is a schematic diagram of the mechanical transmission outlay of a wind-driven pressurizing pump (I); a side view of the wind-pump integrated transmission outlay (II); and a front view of the wind-pump integrated transmission outlay (III).
Figure 1:
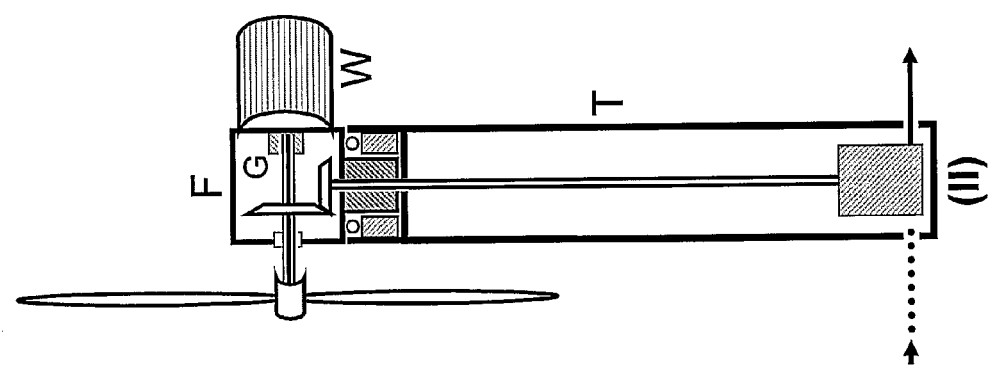
Figure 1:
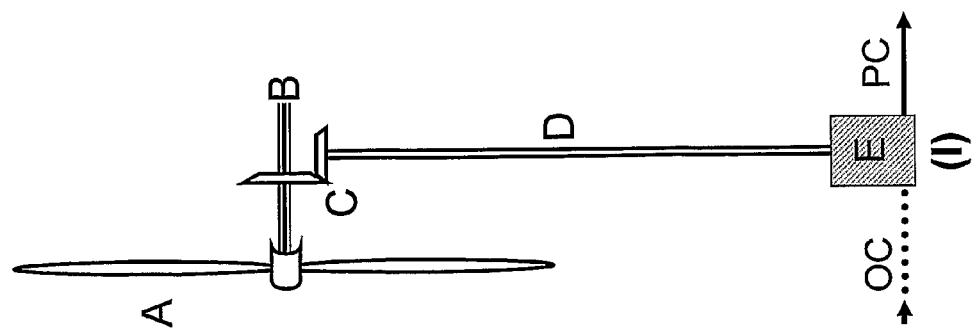

The harnessing of wind power according to the invention involves wind-driven hydraulic pressurizing devices such as a rotor-driven pump units of the preferred embodiment described in FIG. 1; wherein, (I) illustrates the outlay of the mechanical transmission; and whereas, the side and front views of the wind-pump integrated transmission outlay displayed in (II) and (III), respectively. The transmission outlay in (I) comprising a vertical rotor (A) with fixed pitch blades for maximum capture of wind power; a rotor shaft (B); a gearbox mechanism of fixed desired transmission ratio (C) to enable the attainment of rotor tip-speed-ratio range of high power coefficient (>0.45) over an extended section of a wind regime wherein most of the energy is stored; a vertical shaft (D) which conveys the rotor motion through said gearbox mechanism to a positive displacement pressurizing pump (E) of a fixed desired geometric displacement; an open circuit (OC) conduit (dotted line) inlet of non-pressurized feed supply to said pressurizing pump; and a pressurized feed flow outlet from said pressurizing pump to a pressurized circuit (PC) conduit (solid line). The side view of the wind-pump unit with its entire transmission outlay in FIG. 1(II) also shows the rotor housing in the hub (F); the support tower (T); the wind tracking tail (W) and the brakes mechanism of the rotor shaft (G) whereby rotor motion is stopped in case of high winds to avoid damage. The hub (F) is designed to track the wind by a horizontal sweep mechanism around a vertical axis. The front view of the wind-pump is displayed in FIG. 1(III) with an illustrated rotor of three blades. Large wind-pump units of the type considered hereinabove will require a motor driven wind tracking mechanism controlled by a wind direction sensor, instead of the wind tail W displayed in FIG. 1 (II).

Conversion of wind power ($P_w$) to hydraulic power by a single wind-pump unit of the preferred embodiment described in FIG. 1, proceeds according to expression (4); wherein, $Q_h$(lpm) stands for pressurized hydraulic flow, p(bar) for hydraulic pressure, $f_h$ for efficiency of pressurizing pump, n(rpm) for speed of pressurizing pump, $V_g$(liter) for fixed geometric displacement per revolution of the positive displacement pressurizing pump, N(rpm) for speed of wind-driven rotor, and g for a fixed gearbox transmission ratio of rotor to pump. The rotor speed in the wind-pump unit of the preferred embodiment is expressed by (5) in terms of $P_w$, $f_h$, g, $V_g$ and p and the tip-speed-ratio experienced by the rotor ($\lambda$) expressed by (6) in terms of $P_w$, $f_h$, g, $V_g$, p and the wind velocity v(m/sec).

$$P_w(\text{kW}) = (Q_h p)/(592 f_h) = (n p V_g)/(592 f_h) = (N p g V_g)/(592 f_h) \qquad (4)$$

$$N = (592 P_w f_h)/(p g V_g) \qquad (5)$$

$$\lambda = [(\pi R)/30][(592 P_w f_h)/(p g V_g)]/v \qquad (6)$$

$$\Sigma P_w = P_w(1) + P_w(2) + \ldots + P_w(k) \qquad (7)$$
$$= [(\Sigma Q_h) p]/(592 f_h)$$
$$= k(n p V_g)/(592 f_h)$$
$$= k(N p g V_g)/(592 f_h)$$

The total wind power availability of a wind farm comprises k identical wind-pump units, which experience the same wind conditions, is expressed by (7). If combined hydraulic flow ($\Sigma Q_h$) of the entire wind farm is consumed at the same flow rate, for instance by a fixed flow hydraulic motor or turbine, the stationary state conditions of a fixed flow ($\Sigma Q_h$=Constant) system also imply fixed speed of rotors (N=Constant) and pumps (n=Constant) with increased torque as function of increased hydraulic pressure due to increased wind velocity. The use of the entire hydraulic flow of said wind farm of k wind-pump units to actuate a single fixed flow/speed hydraulic motor/turbine with its attached rated electric generator(s), will result in rated electric power generation at a single power level with speeds of rotor and of hydraulic pump remain essentially constant. The use of the entire hydraulic flow of said wind farm of k wind-pump units to actuate alternately and/or simultaneously two or more fixed flow/speed hydraulic motors/turbines with their attached rated electric generators, creates multitude of power levels, each characterized by distinct stationary hydraulic flow conditions which manifest a fixed speed of rotors and pumps; thereby, enable continuous conversion of wind power to rated electric power with high power efficiency over a wide section of a wind regime.

The application of the inventive method for continuous rated electric power generation from a wind farm of k wind-pump units [(WM(1), WM(2), WM(3) ... WM(k)] with their respective rotors driven pumps [P(1), P(2), P(3) ... P(k)] is illustrated by the preferred embodiment displayed in FIG. 2; wherein, continuous generation of rated electric power proceeds by the alternating and/or simultaneous actuation of two fixed speed hydraulic motors (M1 and M2), each engaged, alternately and/or simultaneously, with two rated generators (G11 and G12 associated with M1 and G21 and G22 associated with M2) as function of the wind power availability; thereby, allow continuous rated electric power generation with high power conversion efficiency over a wide range of wind velocities. Pressurized hydraulic flow transmission from wind-pump units to hydraulic motors (M1 and M2) inlets takes place by means of a pressurized circuit (PC) conduit (solid lines), with decompressed hydraulic flow from outlets of hydraulic motors recycled back to inlets of the wind-pump units by means of an open circuit (OC) conduit (dotted line) and an open circuit reservoir (OCR).

Figure 2:
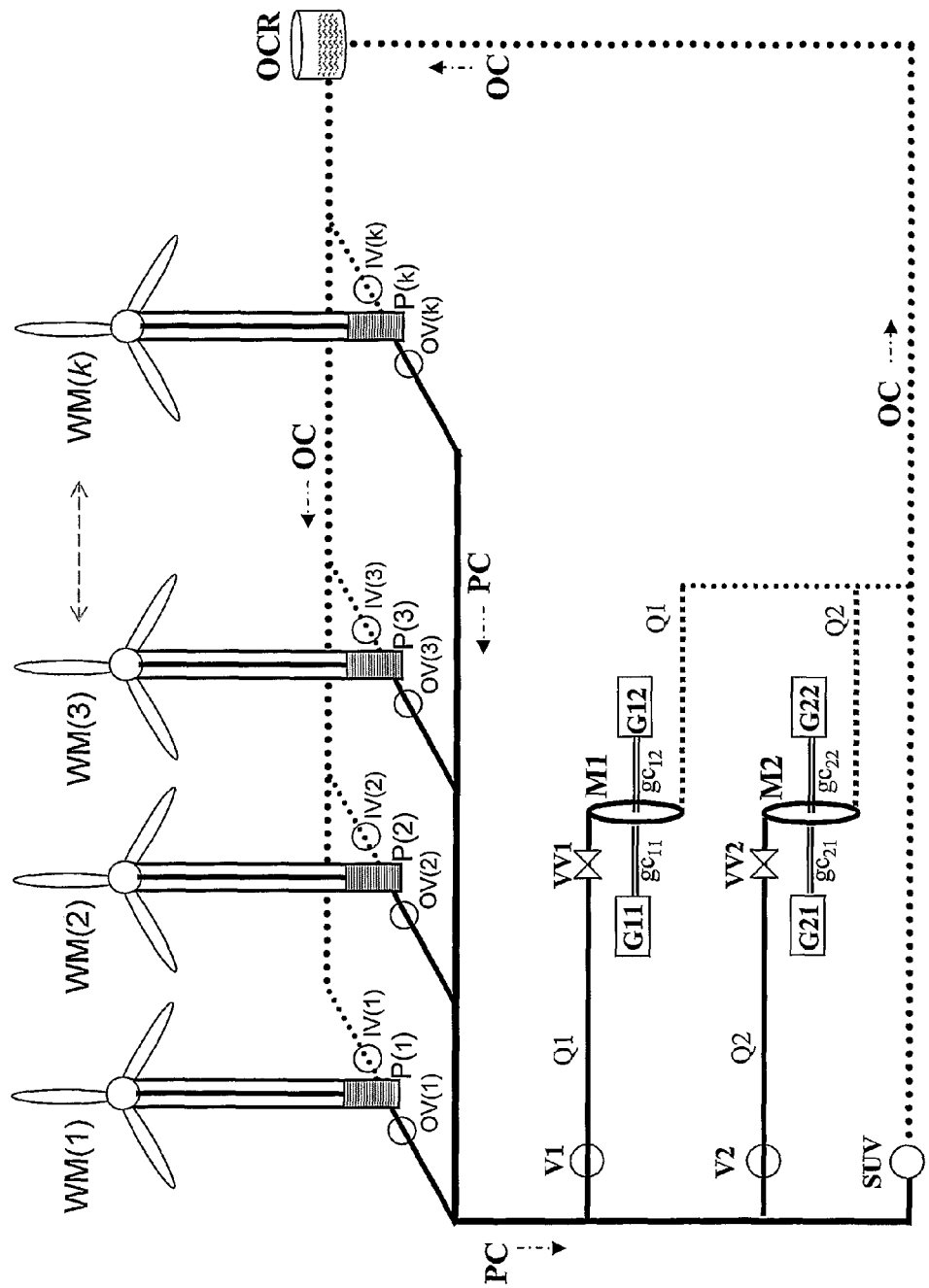
FIG. 2 is a schematic diagram of a wind farm for rated electric power production, comprising k wind-driven pressurizing pump units; conduits of pressurized and non-pressurized hydraulic flow; two fixed flow/speed hydraulic motors and two fixed speed electric generators per each motor; valve means to enable the engagement of each said hydraulic motor with said conduit of pressurized hydraulic flow; variable valve means to enable fixed the speed actuation of each said hydraulic motor; valve means to initiate said wind farm operations, and with entire system made to operate efficiently by the alternate and/or simultaneous actuation of motors and/or generators as function of wind power availability.

The wind-pump units in the wind farm of the preferred embodiment in FIG. 2 are connected in parallel to the OC and PC conduits through the respective inlet valves [IV(1), IV(2), IV(3) ... IV(k)] and outlet valves [OV(1), OV(2), OV(3) ... OV(k)], and this design enables the isolation of a specific wind-pump unit for maintenance and/or repair from the rest of the wind farm without stopping its operation. The connections of the hydraulic motors M1 and M2 to the pressurized circuit conduit (PC) take place by the valve means V1 and V2, respectively, and the constant speed/flow actuation of said hydraulic motors takes place by means of the respective variable flow valve means VV1 and VV2 which are operated in response to deviation from the desired rated speed of said motors, with decreased speed responded by increased flow and visa versa.

The rated electric generators associated with each of the hydraulic motors, or hydraulic turbines instead, in the preferred embodiment displayed in FIG. 2, are made to actuate alternately and/or simultaneously by clutch-gear mechanism means [$gc_{11}$ and $gc_{12}$, for connecting the respective rated generator G11 and G12 with the shaft of M1; and $gc_{21}$ and $gc_{22}$ for connecting the respective rated generator G21 and G22 with the shaft of M2] as function of wind power availability manifested by the wind velocity and/or by the hydraulic pressure created in the pressurized conduit (PC) of the wind farm system. The system under review in the preferred embodiment displayed in FIG. 2 is distinguished by 3 stationary hydraulic flow levels (Q1, Q2 and Q1+Q2) as well by 3 stationary speed levels of pumps and of rotors; whereby, the tip-speed-ratio of rotors is controlled in regions of high power coefficient. The configuration under review in the preferred embodiment displayed in FIG. 2 enables up to 15 distinct levels of rated electric power generations of which 3 such levels arise from the engagement of M1 (G11, G12 and G11+G12), 3 such levels arise from the engagement of M2 (G21, G22 and G21+G22) and 9 such levels arise from the simultaneous engagement of both M1+M2 (G11+G21; G11+G22; G12+G21; G12+G22; G11+G12+G21; G11+G12+G22; G21+G22+G11; G21+G22+G12 and G11+G12+G21+G22). In practice, continuous conversion of wind power to rated electric power with high efficiency in the preferred embodiment displayed in FIG. 2 may necessitate in most instances the use of only 7-8 of the 15 available rated electric generation levels.

Figure 3:
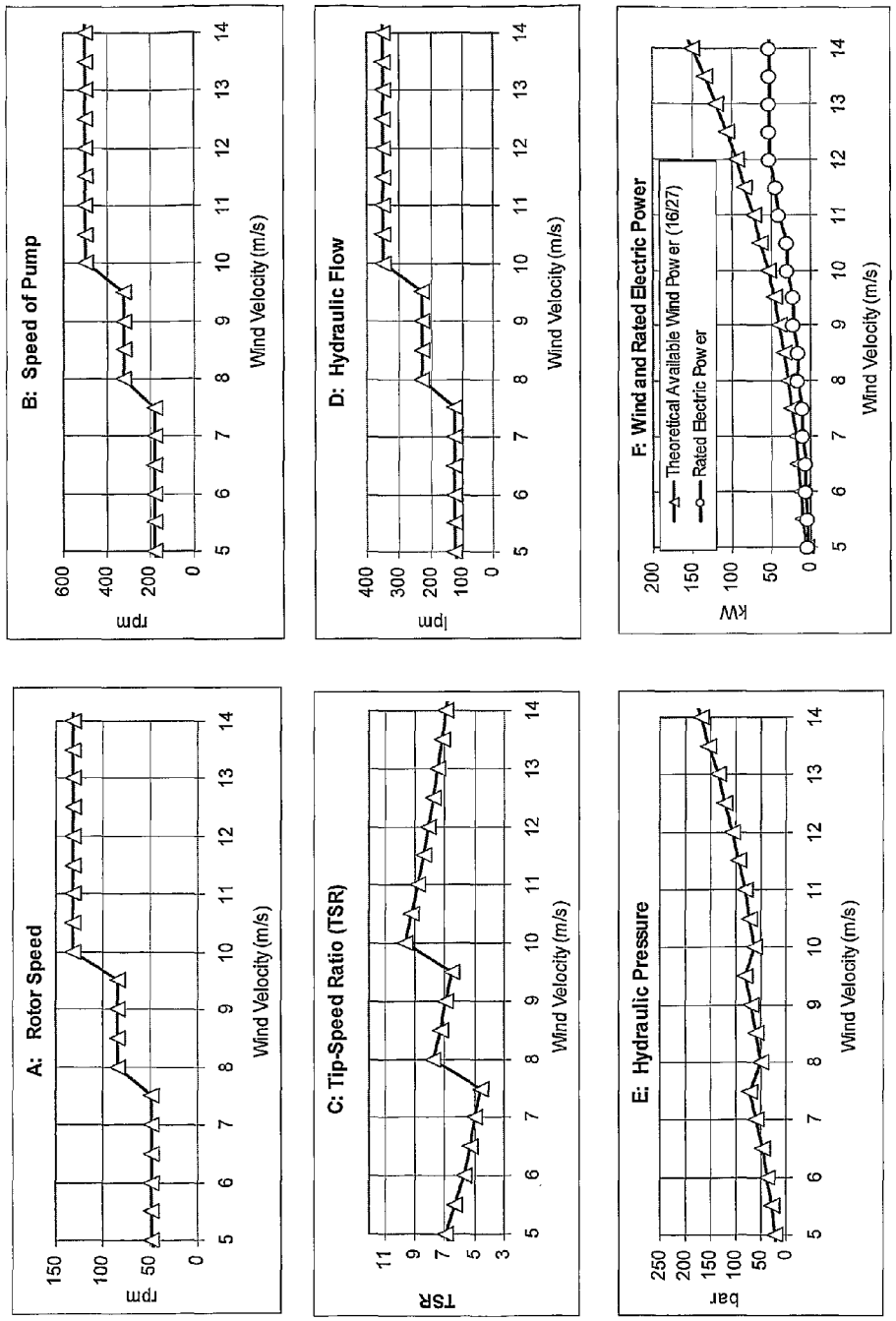
FIG. 3 is the description of performance characteristics of a single wind-pump unit for rated electric power generation, driven by a rotor of 7.0 meter radius in a wind regime with an average wind velocity of 6.0 m/s and a nominal wind velocity of 8.0, according to EXAMPLE 1.

Rated electric power generation of a wind farm according to the preferred embodiment in FIG. 2 comprising one (k=1) or more (k=4, 6 and 8) wind-pump units with fixed blades rotor of 7.0 meter radius, is illustrated in EXAMPLE 1 for a specific moderate quality wind regime with an average wind velocity of 6.0 m/sec and a nominal wind velocity of 8.0 m/sec. The performance characteristics of wind farms with such wind-pump units under the specified wind regime in EXAMPLE 1 are furnished in FIG. 3 with respect to rotor speed (A); speed of pump (B); tip-speed-ratio (C) assuming high power coefficient (>0.45) attained in the range of 5-10; hydraulic flow (D); hydraulic pressure (E); and the theoretical available wind power as compared with the rated electric power production (F). The sequential operations of hydraulic motors and generators in EXAMPLE 1 according to the preferred embodiment in FIG. 2 with k=1, 4, 6 and 8 wind-pump units, are illustrated in TABLE 1 with respect to levels of hydraulic flow (Q1, Q2 and Q1+Q2), the engagements hydraulic motors (M1 and M2) and generators (G11, G12, G21 and G22) and the total rated electric power (kW) output as a function of wind velocity.

TABLE 1

Rated electric power and fixed hydraulic flow levels in the Wind Farms described in EXAMPLE 1 in referance to fixed blades rotors (R = 7.0 meter) and a wind regime* with an average wind velocity of 6.0 m/s and a nominal wind velcoity of 8.0 m/s

| | | | | Rated Power(kW) and Hydraulic Flow (m3/h) of Wind Farms with k Wind-pumps (R = 7.0 m) | | | | | | | |
|---|---|---|---|---|---|---|---|---|---|---|---|
| Sequence of Actuation (Motors & Generators) | | | | k = | | | | | | | |
| Wind Bands | Hydraulic | Hydraulic | Rated | 1 | | 4 | | 6 | | 8 | |
| (m/s) | Motors | Flow | Generators | m³/h | kW | m³/h | kW | m³/h | kW | m³/h | kW |
| 5.0-5.5 | M1 | Q1 | G11 | 7.5 | 3.3 | 30 | 13 | 45 | 20 | 60 | 26 |
| 6.0-6.5 | M1 | Q1 | G12 | 7.5 | 5.5 | 30 | 22 | 45 | 33 | 60 | 44 |
| 7.0-7.5 | M1 | Q1 | G12 + G11 | 7.5 | 8.8 | 30 | 35 | 45 | 53 | 60 | 70 |
| 8.0-8.5 | M2 | Q2 | G21 | 13.5 | 11.0 | 54 | 44 | 81 | 66 | 108 | 88 |
| 9.0-9.5 | M2 | Q2 | G22 | 13.5 | 20.0 | 54 | 80 | 81 | 120 | 108 | 160 |
| 10.0-10.5 | M1 + M2 | Q1 + Q2 | G22 + G12 + G11 | 21.0 | 28.6 | 84 | 114 | 126 | 172 | 168 | 229 |
| 11.0 | M1 + M2 | Q1 + Q2 | G22 + G21 + G12 | 21.0 | 36.5 | 84 | 146 | 126 | 219 | 168 | 292 |
| 11.0-15.0 | M1 + M2 | Q1 + Q2 | G22 + G21 + G12 + G11 | 21.0 | 39.6 | 84 | 158 | 126 | 238 | 168 | 317 |

*The average annual frequency distributiion of bands in the regime are specified in EXAMPLE-1

All the components and parts which are required in the context of the inventive system and method for the generation of rated electric power from wind farms are commercial items of diverse specifications and widespread availabilities. While the inventive method does not restrict the use of specific hydraulic fluids, the application of water or of water solutions as hydraulic fluids in the system of the inventive method should be preferred on grounds of low compressibility, low viscosity, low friction induced pressure losses in conduits, low cost and the exceptionally widespread availability of versatile components and parts for such a purpose. The preferred pressurizing devices for high power conversion efficiency by the inventive method should comprise positive displacement pumps, plunger or piston type, that are noted for their high hydraulic efficiency. Likewise, the preferred choice of components for the rated electric power generation system of the inventive method should comprise high efficiency positive displacement hydraulic motors or turbines, combined with high efficiency rated electric generators. Moreover, the gearbox and clutch mechanisms whereby rated generators are selectively engaged with the constant speed variable torque shaft of said motors, or turbines, should be characterized by high mechanical efficiency as well as by simple and effective actuation modes.

Another aspect of the invention is concerned with the variable hydraulic flow generation of essentially fixed pressure by wind farms with wind-pump units of the type already described hereinabove for rated electric power generation. The performance of a single wind-driven positive displacement pump expressed by (4) and of multitude such units in a wind farm configuration expressed by (7), reveal that hydraulic flow rate is a function of wind power and pressure, therefore, such a system can be made to deliver variable flow at a fixed desired pressure as a function of wind power availability. The preferred embodiment according to the invention of a wind farm made to supply feed of variable flow at a fixed desired pressure as function of wind power availability is displayed in FIG. 4; wherein, a water source (WS) is used to feed the wind-pump units [P(1), P(2), P(3) . . . P(k)] through an open circuit (OC) conduit, and whereas, the pressurized feed flow created by the wind-pump unit(s) in the pressurized circuit (PC) is maintained at an essentially fixed desired pressure by variable valve means (VV) controlled by a pressure monitor (PM). The mechanism of generation of variable hydraulic flow of fixed pressure in said wind farm relies on continuous monitoring of pressure in the pressurized circuit (PC) conduit, as well as deviation of monitored pressure ($p_{mon}$) form a set point of a desired fixed pressure ($p_{fix}$), with actuation of the variable valve means (VV) prompted in response to the monitored pressure deviation from a fixed desire pressure ($\Delta p = p_{mon} - p_{fix}$), and whereby $+\Delta p$ ($p_{mon} > p_{fix}$) will effect a flow increase by the VV at outlet of the pressurized circuit conduit (PC), and whereas, $-\Delta p$ ($p_{mon} < p_{fix}$) will effect a flow decrease by the VV at outlet of the pressurized circuit conduit (PC). Accordingly, the inventive method considered hereinabove the generation of variable flow of an essentially fixed desired pressure as function of wind power availability for multitude of noteworthy applications several of which are detailed below.

Figure 4:
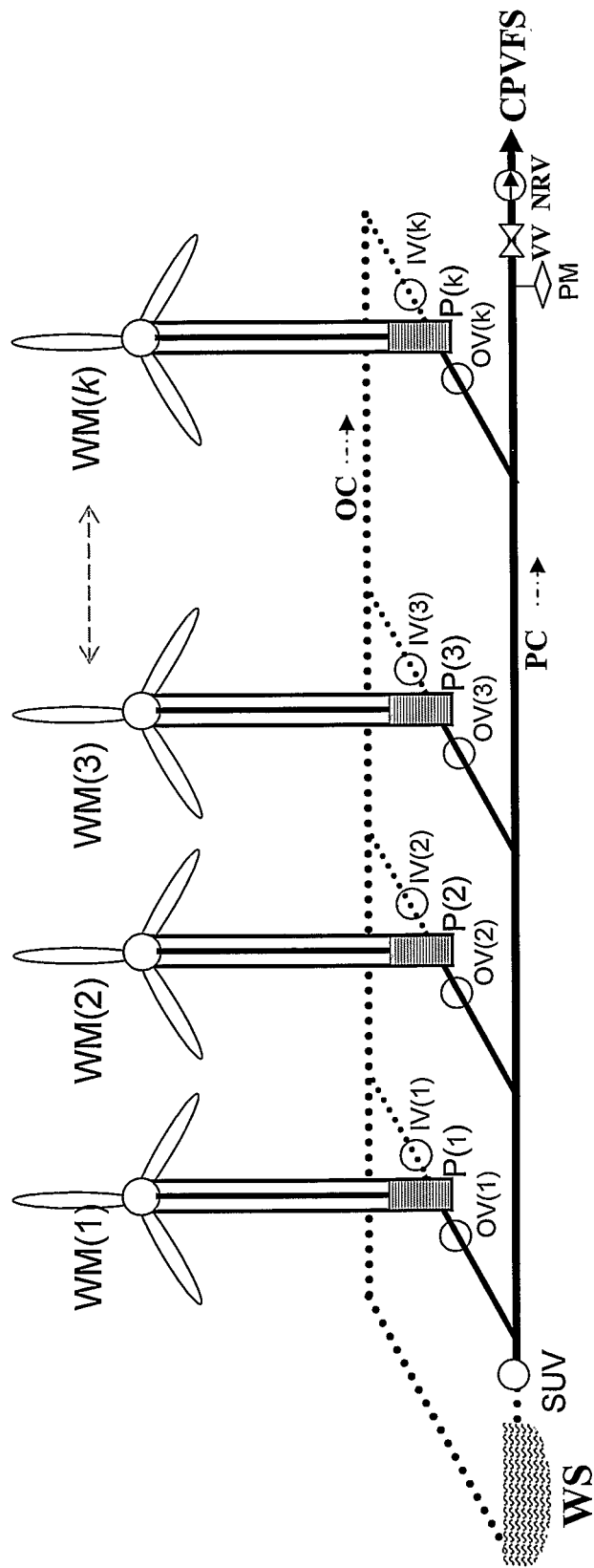
FIG. 4 is a schematic diagram of a wind farm for creating variable flow of fixed pressure of a desired feed source, comprising k wind-driven pressurizing pump units; conduits of pressurized and non-pressurized hydraulic flow; valve means to initiate said wind farm operation and to enable one directional flow of pressurized feed; and variable valve means whereby variable flow of a desired fixed pressure is produced continuously as function of wind power availability in said wind farm.

The efficiency of generation of constant pressure variable flow supply (CPVFS) in a wind farm according to the preferred embodiment displayed in FIG. 4, depends on the efficiency of pumps as well as the on the ability of rotors to experience high power coefficient. Positive displacement pumps of the types incorporated in the inventive method are noted for their high hydraulic efficiency (>85%), and therefore, contribute to the high energy conversion efficiency of wind power to hydraulic power according to the inventions. The attainment of high power coefficient of rotors in the context of the invention is achieved by means of a multi-step gearbox ratio transmission between the shaft of each rotor and pump, with gear shifting induced at specific wind velocities to allow the control of tip-speed-ratio of rotors in the range of high power coefficient over an extended section of the wind regime. Other noteworthy features in the preferred embodiment displayed in FIG. 4 include a no return valve (NRV) device at pressurized feed outlet of the entire system which provides a safeguard against back flow and a start up valve (SUV) means at inlet of non-pressurized feed conduit to enable the initial build up of pressurized flow in said principle conduit of pressurized flow, with a minimum resistance to the rotor motion.

The most obvious use of the preferred embodiment displayed in FIG. 4 is for the pumping of ground water from lakes, rivers, springs and reservoirs to higher altitudes for agricultural and/or domestic and/or industrial applications. A similar application is described by the preferred embodiment in FIG. 5 for the elevation water from a lower reservoir (LR) to an upper reservoir (UR) for the purpose of hydroelectric generation (HEG), which takes place by the opening of the turbine valve means TV during peak demand of electric power and/or to supplement conventional electric power production.

The ability to generate efficiently a constant pressure variable flow supply (CPVFS) from clean, renewable and free wind power is also of enormous global interest from the stand point of desalination by revere osmosis (RO) as well as for membrane filtration (Mico-filtration, Ultra-filtration and Nano-Filtration) processes which are illustrated next in the context of the inventions. Desalination by means of constant pressure variable flow created in a wind farm is describe by the preferred embodiment in FIG. 6, wherein pressurized feed of a salt water source (SWS) is used for RO desalination processes, either of Sea Water (SWRO) or of Brackish Water (BWRO), whereby desalted permeates (PER) and Brines (BR) are produced.

This approach to RO desalination may be found particularly cost effective for SWRO processes in light of their high energy demand and since electric power produced from fossil fuels is becoming excessively expensive. The recently described approach of closed circuit desalination of Sea Water (PCT Publication Number WO 2005/016830 A2) and of Brackish Water (PCT Publication Number WO 2006/001007) may be found particularly useful in the context of the RO unit of the preferred embodiment in FIG. 6 since such new techniques allow the attainment of high recovery irrespective of the pressurized feed flow, this due to their reliance on internal recycling to effect low concentration polarization.

Figure 6:
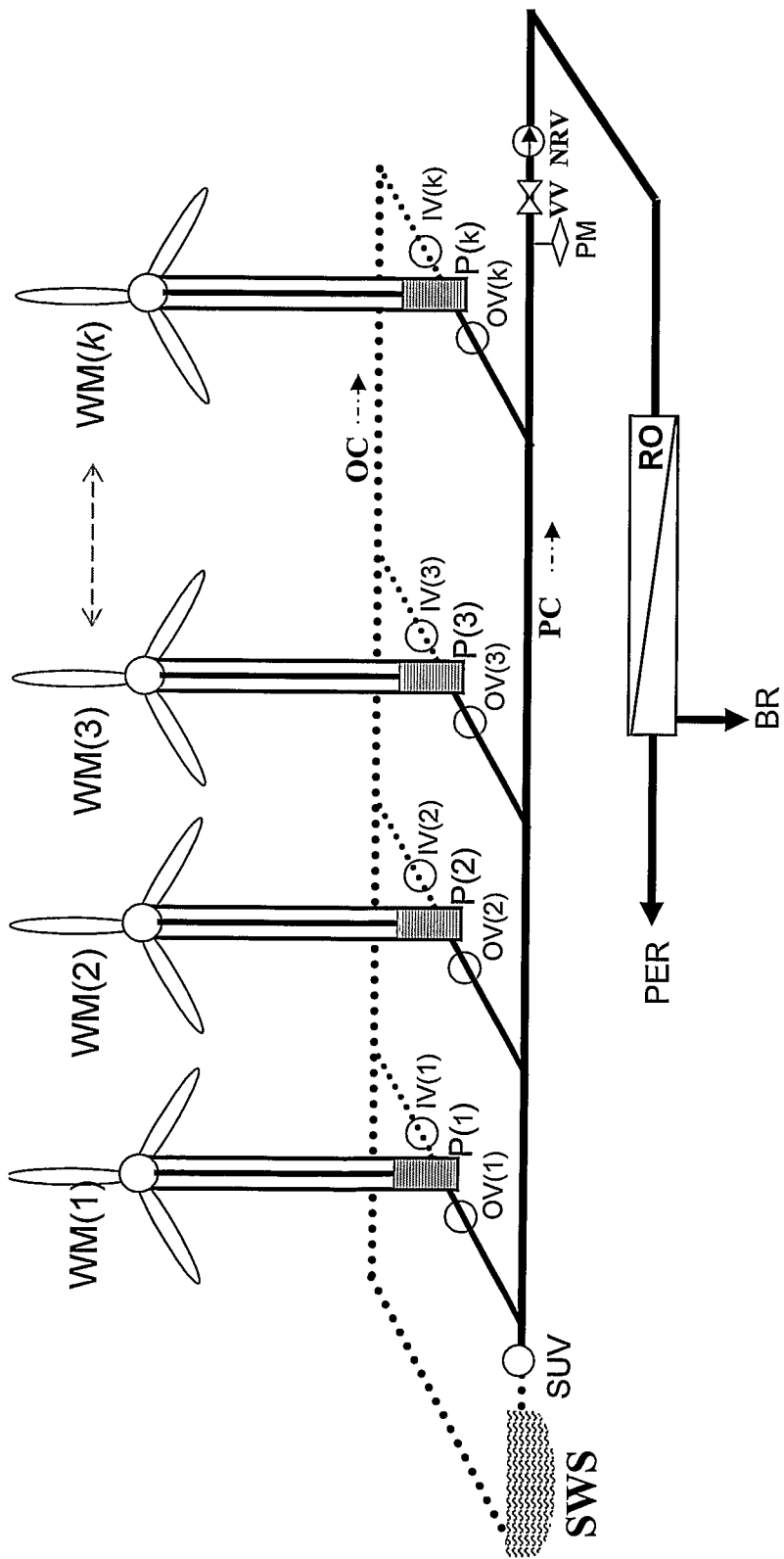
FIG. 6 is a schematic diagram of a wind farm for salt water desalination by reverse osmosis (RO), comprising k wind-driven pressurizing pump units; conduits of pressurized and non-pressurized salt water; valve means to initiate said wind farm operation and to enable one directional flow of pressurized feed; variable valve means to enable continuous production of variable hydraulic flow of a fixed desired pressure as function of wind power availability in said wind farm; and a reverse osmosis unit with its conduits of pressurize salt water feed, brine effluent and permeate.

The principle disadvantage of the preferred embodiment in FIG. 6 for RO desalination of salt water solutions arises from the need of corrosion resisting construction materials for all metal parts which come in contact with the salt water solution in the entire wind farm, especially the pumps, the valves and the pressurized feed conduits. While said disadvantage is of little impact for small wind farms comprising one or two wind-pump units, it translates to a major expense with increased size wind farms for RO desalination of the type described in FIG. 6. The preferred embodiment for a medium to large size wind-driven RO desalination plant according to the invention is described in FIG. 7, wherein the pressurized flow in the entire wind farm is generated with potable water, and whereas, the salt water feed (SWF) is converted to pressurized salt water feed (PSWF) at the inlet to the RO unit by means of an hydraulic pressure exchange (HPE) device driven by the pressurized hydraulic flow created in the pressurized circuit (PC) conduit of the wind farm. The HPE device in FIG. 7 is of the type applies by conventional RO processes for the recovery of energy from pressurized brine effluent and its efficient use for pressurizing fresh feed; however, in the instance of the preferred embodiment under review the energy recovery is done reversely, namely, the pressurize flow of potable water is used in order to pressurize the salt water solution feed to the RO unit.

Figure 7:
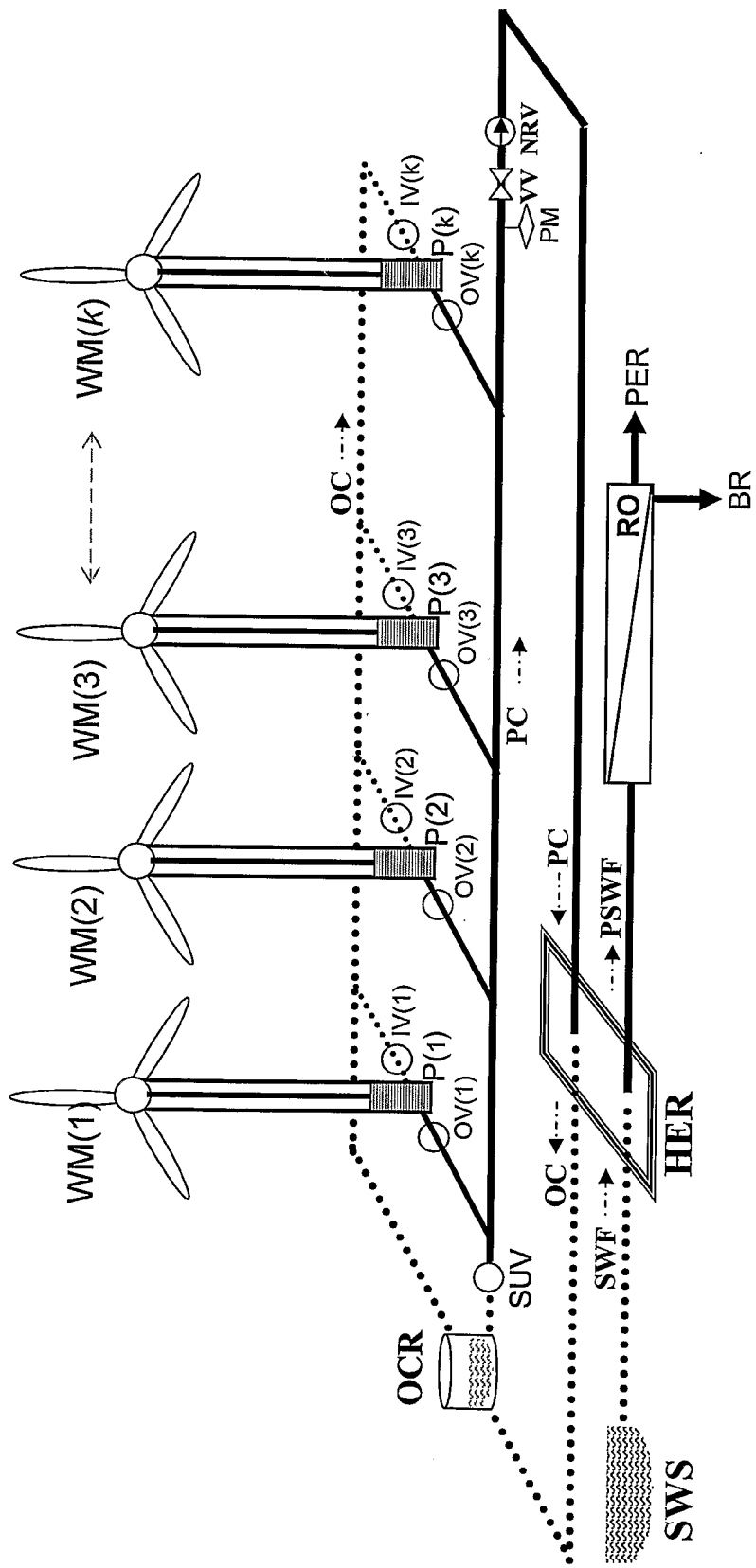
FIG. 7 is a schematic diagram of a wind farm for salt water desalination by reverse osmosis (RO), comprising k wind-driven pressurizing pump units; conduits for recycling of pressurized and non-pressurized flow of potable water; valve means to initiate said wind farm operation and to enable one directional flow of pressurized feed; variable valve means to enable continuous production of variable hydraulic flow of a fixed desired pressure as function of wind power availability in said wind farm; hydraulic pressure exchange unit, (Energy Recovery unit) wherein said pressurized flow of potable water serves to pressurize a salt water solution; and a reverse osmosis unit with its conduits of pressurize salt water feed, brine effluent and permeate.
Figure 8:
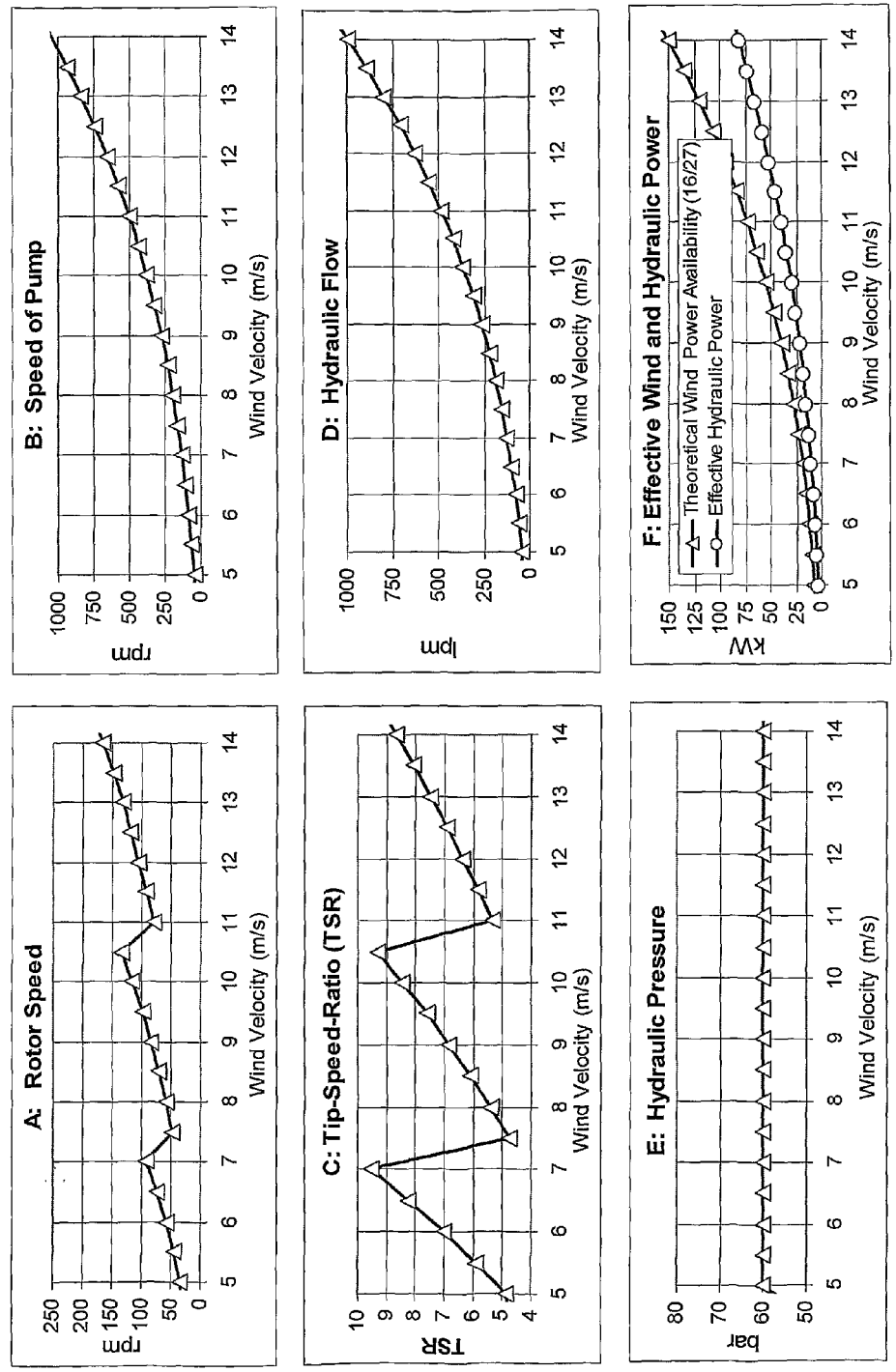
FIG. 8 is the description of performance characteristics of a single wind-pump unit for desalination of sea water (3.5%) by reverse osmosis, driven by a rotor of 7.0 meter radius in a wind regime with an average wind velocity of 6.0 m/s and a nominal wind velocity of 8.0, according to EXAMPLE 2.

The desalination of Sea Water (3.5%) under constant pressure (60 bar) of variable flow created by wind farms according to the preferred embodiments of the invention displayed in FIG. 6 (k=1, 4, 6 and 8), or in FIG. 7 (k=1, 4, 6 and 8), is illustrated in EXAMPLE 2 for a specified medium quality wind regime with an average wind velocity of 6.0 msec and a nominal wind velocity of 10.0 msec. The performance characteristics a single wind-pump unit in EXAMPLE 2 is illustrated in FIG. 8 with respect speed of rotor (A); speed of pump (B); tip-speed-ratio of rotor (C) in the range 5-10 of presumed high power coefficient (>0.45); hydraulic flow (D); hydraulic pressure (E); and the theoretical available wind power as compared with the effective hydraulic power of the system (F). The rotor speed is adjusted in the desired tip-speed-ratio (TSR) range of presumed of high power coefficient, by means of a three steps gearbox mechanism with gear ratio selected to enable TSR of 5.0 at the wind velocities 5.0, 7.5 and 11.0 msec. The performance summary furnished in TABLE 2 is of the wind driven desalination systems described in EXAMPLE 2 according to the preferred embodiments displayed in FIG. 6, or in FIG. 7, with k=1, 4, 6 and 8 windmill-pump units (R=7.0 m).

able flow conditions determined by wind power availability. Another noteworthy application of the inventions is for the elevation of water by mean of wind power from a lower to an upper reservoir for the purpose of energy storage to enable rated hydroelectric power generation when demand for electricity arises especially as supplement production during pick hour demand.

Figure 5:
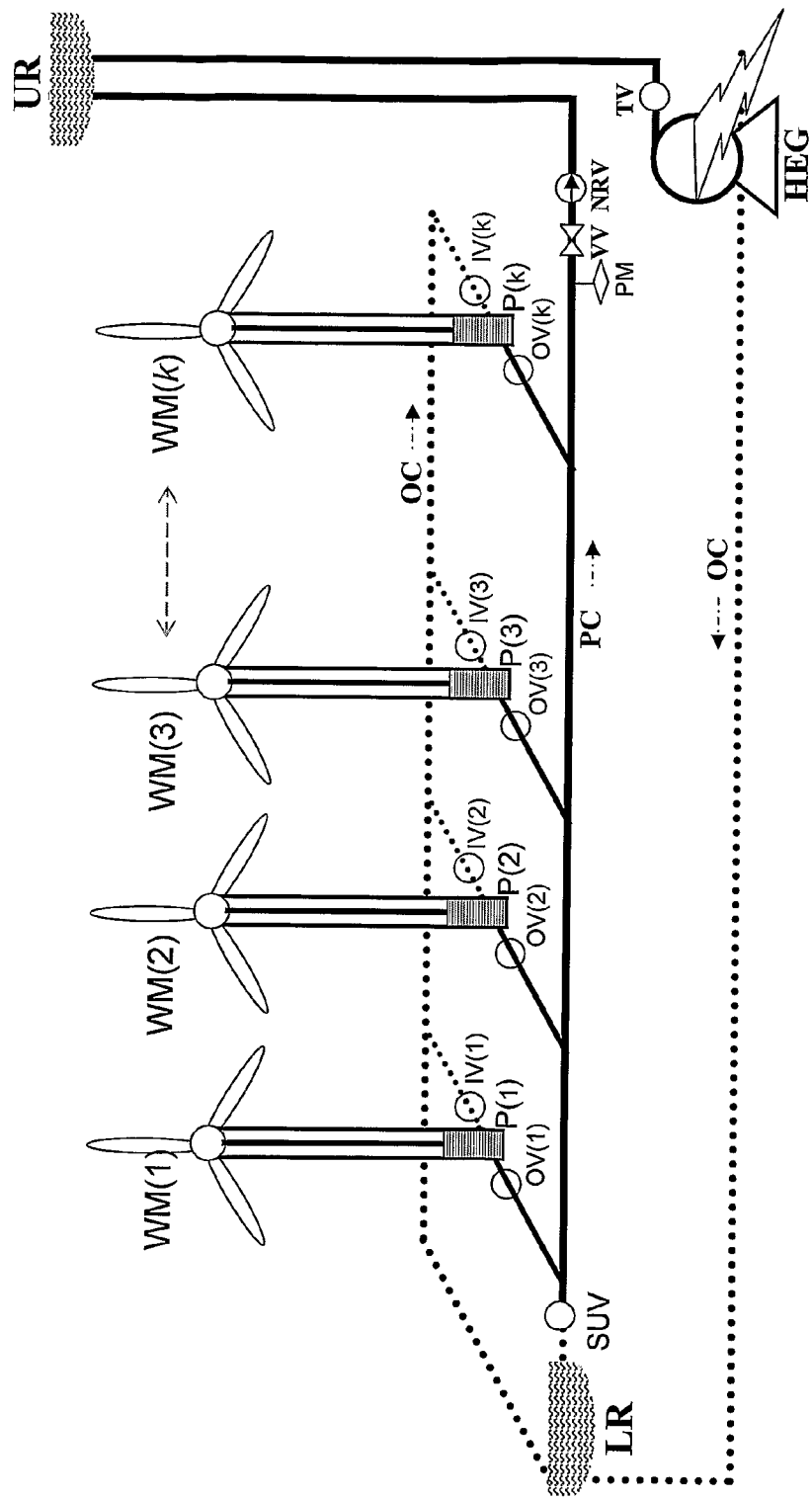
FIG. 5 is a schematic diagram of a wind farm for water lifting from a lower to an upper reservoir for the purpose of hydroelectric power generation, comprising k wind-driven pressurizing pump units; conduits of pressurized and non-pressurized hydraulic flow; valve means to initiate said wind farm operation and to enable one directional flow of pressurized feed; variable valve means to enable continuous production of variable flow of a desired fixed pressure as function of wind power availability in said wind farm; and hydroelectric turbine and it conduits and valve means for starting and stopping operation.

It will be understood that the design of the preferred embodiments of the inventive wind-driven fluid pressurizing unit displayed in FIG. 1 and its applications in wind farms intended for rated electric power generation according to the preferred embodiments displayed in FIG. 2 and in FIG. 5, for conduction of water supplies under constant pressure of variable flow conditions according to the preferred embodiment displayed in FIG. 4, and for desalination by reverse osmosis according to the preferred embodiments displayed in FIG. 6 and in FIG. 7, are schematic and simplified and are not to be regarded as limiting the invention. In practice, the wind-driven fluid pressurizing units and their wind farm applications for rated electric power generation, for desalination by reverse osmosis, for filtration, for conduction of water supplies and/or for elevation of water under fixed pressure according to the invention, may comprise many additional lines, conduits, branches, valves, and other installations,

TABLE 2

Desalination of Sea Water (3.5%) under constant pressure (60 bar) of variable flow in wind farms according to EXAMPLE 2 with fixed pitch rotors (7.0 m radius) and rotor-driven positive displacement pumps, performed in a medium wind regime* with an average wind velocity of 6.0 m/s and a nominal wind velocity of 8.0 m/s.

| Items | Wind Farm of n Windmills (R = 7.0 m) | | | |
|---|---|---|---|---|
| | n = | | | |
| | 1 | 4 | 6 | 8 |
| Minimum flow (m³/h) at 60 bar (v = 5.0 m/s) | 2.7 | 10.8 | 16.2 | 21.6 |
| Maximum flow (m³/h) at 60 bar (v = 13.5 m/s) | 53.2 | 213 | 319 | 426 |
| Pressurized (60 bar) flow (m3/h) at average wind velocity (v = 6.0 m/s) | 4.7 | 19 | 28 | 37 |
| Pressurized (60 bar) flow (m3/h) at nominal wind velocity (v = 8.0 m/s) | 11.1 | 44.4 | 66.6 | 88.8 |
| Daily average volume (m³) of pressurized flow (60 bar) | 227.2 | 909 | 1,363 | 1,817 |
| Annual average volume (m³) of pressurized flow (60 bar) | 82,921 | 331,685 | 497,528 | 663,370 |
| Daily average volume (m³) of SWRO permeates ($Q_{feed} = Q_{perm}$)** | 227.2 | 909 | 1,363 | 1,817 |
| Annual average volume (m³) of SWRO permeates ($Q_{feed} = Q_{perm}$)** | 82,921 | 331,685 | 497,528 | 663,370 |
| Annual average stored/used/saved hydraulic energy (kWh)*** | 140,070 | 560,279 | 840,418 | 1,120,558 |

(*)Annual Average Frequency Distribution of Velocity Bands: Provided in EXAMPLE 2
(**)Assumption: Closed circuit RO desalination with the same flow rate of pressurized feed and permeate
(**)Energy Conversion Expression: E = pV/35.52: wherein: E, kWh; p, bar and V, m³

Desalination of sea water is an energy rich process of 2.5-4.5 kWh/m³, depending on the salinity of the source, and the utility of renewable clean wind energy for such an application is of major environmental importance. A daily production of 227 m³ (TABLE 2) sea water desalination permeates by a single wind-pump unit (R=7.0 m) according the preferred embodiments of the invention in FIG. 6 or in FIG. 7, is a sufficient supply for a community with population of 2,000, assuming an average consumption of 113.5 liter/person/day.

It will be understood that the inventive wind farm technology whereby variable hydraulic flow of constant pressure is produced as function of wind power availability, can be used for other noteworthy applications, apart from desalination by reverse osmosis, including membrane filtration under constant pressure at the levels of micro-filtration (MF), ultra-filtration (UF) and nano-filtration (NF). The inventive method also provides the means for clean energy wind power utilization for constant pressure water supply needs for domestic and/or agricultural and/or industrial applications under varidevices and monitoring means as necessary according to specific requirements while still remaining within the framework and scope of the inventions and claims.

The preferred embodiments according to the invention of the wind farms in FIG. 2, FIG. 4, FIG. 5, FIG. 6 and FIG. 7 with their wind-driven pressurizing units of the type displayed in FIG. 1 are only basic design configurations intended for simplicity, clarity, uniformity and the convenience of presentation. It will be understood that the general design of wind farms according to the invention is neither limited nor confined by number of wind-pump units and/or by the shape and radius of their rotors and/or by the type of their pressurizing devices. It will also be understood that the general design of wind farms for rated electric power generation according to the invention is neither limited nor confined by the number and type of hydraulic motors, or turbines instead, and/or by the type and number of rated electric generators and/or by a specific sequence whereby said rated electric generators are being actuated alternately and/or simultaneously. In addition it will be understood that the general design of a wind farm intended to supply pressurize feed for desalination by reverse osmosis according to the invention is neither limited nor confined by the SWRO and/or BWRO desalination technique and/or by the nature and/or origin of feed to be desalinated in such a wind farm. It will be noted that the general design of a wind farm intended for pressurizing feed is neither limited nor confined to by the nature and/or type of applications as long as such applications requirements enable the use pressurized feed of variable flow.

It will be obvious to those versed in the art that the inventive wind farm methods under review may be operated with modular and/or non-modular wind-driven pressurizing units and apparatus of different designs, as already explained hereinabove in respect of the inventive systems and/or units within the systems, as long as such systems and/or units comprise: wind-driven devices for creating hydraulic flow; hydraulic flow operated motors, or turbines, of constant speed that enable the actuation of rated electric generators as function of wind power availability; and devices which enable the obtainment variable hydraulic flow of fixed pressure suitable for multitude types applications such as desalination by reverse osmosis, filtration and conduction of pressurized fluids.

While the invention has been described hereinabove in respect to particular embodiments, it will be obvious to those versed in the art that changes and modifications may be made without departing from this invention in its broader aspects, therefore, the appended claims are to encompass within their scope all such changes and modifications as fall within the true spirit of the invention.

EXAMPLES

Example 1

The illustration of the invention for rated electric power generation in a wind farm according to the preferred embodiment displayed in FIG. 2, comprising one (k=1) or more (k=4, 6 and 8) identical wind-pump units of the design displayed in FIG. 1 with rotor(s) of 7.000 m radius and fixed angle pitch blades for maximum capture of wind power in a defined wind regime with an average wind velocity of 6.0 m/sec, a nominal wind velocity of 8.0 m/sec and annual average percent distribution of wind velocity (m/s) bands of >1.0 (1.26%); 1.5 (1.89%); 2.0 (2.52%); 2.5 (3.24%); 3.0 (3.96%); 3.5 (4.59%); 4.0 (5.21%); 4.5 (5.75%); 5.0 (6.29%); 5.5 (6.65%); 6.0 (6.80%); 6.5 (6.56%); 7.0 (6.29%); 7.5 (5.84%); 8.0 (5.39%); 8.5 (4.77%); 9.0 (4.14%); 9.5 (3.60%); 10.0 (3.06%); 10.5 (2.61%); 11.0 (2.16%); 11.5 (1.80%); 12.0 (1.44%); 12.5 (1.17%); 13.0 (0.90%); 13.5 (0.72%); 14.0 (0.54%); >14.5 (0.85%). The rotor design of the wind-pump unit(s) is presumed of high power coefficient (>0.45) in the tip-speed-ratio range of 5-10; the connection of rotor to pump in the wind-pump unit(s) is through a gearbox mechanism of fixed (3.8) transmission ratio; the pump in the wind-pump unit(s) is of a positive displacement type with a fixed geometric displacement of 0.70 liter per revolution; the presumed efficiency of the pump in the wind-pump unit(s) is of 88% and its performance limitations confined to maximum speed of 600 rpm, maximum flow of 420 lpm and maximum pressure of 140 bar.

The rated electric power generation in the example under review according to the preferred embodiment in FIG. 2 as applied for a single wind-pump unit comprises two fixed flow controlled hydraulic motors of 85% efficiency each, one (M1) of 100 lpm (Q1) and the other (M2) of 125 lpm (Q2), which are actuated alternately and/or simultaneously by a predetermined sequence as function of wind velocity. The fixed speed rated generators G11 (3.3 kW) and G12 (5.5 kW) are actuated alternately and/or simultaneously by M1, and likewise, the fixed speed rated generators G21 (11.0 kW) and G22 (20.0 kW) are actuated alternately and/or simultaneously by M2, with both sequences of actuation of hydraulic motors and their attached rated generators dictated by the wind velocity, or in simple terms, by the instantaneous wind power availability of the wind regime. The engagement of M1 takes place though valve V1 and its constant speed controlled by the variable valve VV1 in response to deviation from the desired rated speed of the motor, and likewise, the engagement of M2 takes place though valve V2 and its constant speed controlled by the variable valve VV2 in response to deviation from the desired rated speed of the motor. The selected fixed gearbox ratio clutch mechanisms in FIG. 2 ($gc_{11}$, $gc_{12}$, $gc_{21}$ and $gc_{22}$) are designed to enable each attached generator attain its rated speed of operation when engaged with the constant speed hydraulic motor(s) according to a preconceived sequence determined by the wind velocity, or in simple terms, by the instantaneous wind power availability of the wind regime. The pressurized circuit (PC) conduit in the preferred embodiment displayed in FIG. 2 is made of suitable construction materials to withstand a maximum hydraulic pressure of 150 bar; whereas, the open circuit (OC) conduit is intended for low pressure operation just above atmospheric pressure.

The performance a single wind-pump unit of the preferred embodiment in FIG. 2 (k=1) is illustrated in FIG. 7 with respect to speed of rotor (A), speed of pump (B), tip-speed-ratio (C), hydraulic flow (D), Hydraulic pressure (E) and rated electric power generation as function of theoretical wind power availability. The performance summary of the example under review with respect hydraulic flow and rated electric power production in wind farms comprising of 1, 4, 6 and 8 wind-pump units is furnished in TABLE 1.

Example 2

The illustration of the invention for desalination by reverse osmosis (RO) of Sea Water (3.5%) with fixed pressurized feed (60 bar) of variable flow supplied from a wind farm according to the preferred embodiment displayed in FIG. 6, or in FIG. 7, comprising one (k=1) or more (k=4, 6 and 8) identical wind-pump units of the design displayed in FIG. 1 with rotor(s) of 7.000 m in radius and fixed angle pitch blades for maximum capture of wind power in a defined wind regime with an average wind velocity of 6.0 msec, a nominal wind velocity of 8.0 m/sec and annual average percent distribution of wind velocity (m/s) bands of the exact same wind regime specified in EXAMPLE 1. The rotor design of the wind-pump unit(s) is presumed of high power coefficient (≥0.45) in the tip-speed-ratio range of 5-10; the connection of rotor to pump in the wind-pump unit(s) is through a gearbox mechanism of the 3 distinct transmission ratios 1.43, 3.30 and 6.30 initiated at the respective wind velocities 5.0, 7.0 and 10.5 msec in order to enable the adjustment of the tip-speed-ratio to its starting level of 5.0 and thereby allow for continuous operation with high power coefficient over a wide wind regime. The pump in the wind-pump unit(s) is of a positive displacement type with a fixed geometric displacement of 0.95 liter per revolution, the presumed efficiency of the pump in the wind-pump unit(s) is of 88% and its performance limitations confined to maximum speed of 800 rpm, maximum flow of 760 lpm and a fixed pressure of 60 bar. The conduits of the pressurized circuit of the salt water source (SWS) and of brine (BR) in FIG. 6 as well as valves and pumps are made of suitable construction materials to withstand the corrosive effects of the feed and allow safe high pressure (60 bar) operation; and the same also applies for preferred embodiment in FIG. 7 with respect to the conduits labeled SWF, PSWF and BR. The variable flow fixed pressure (60 bar) operation in the system of the preferred embodiment is achieved by the controlled actuation of the variable valve VV in response to pressure deviation from the predetermined set point of 60 bar.

The performance characteristics of a single wind-pump unit (k=1) according to the example under review on the basis the preferred embodiments in either FIG. 6 or FIG. 7 is illustrated in FIG. 8 with respect to rotor speed (A), speed of pump (B), tip-speed-ratio (C), hydraulic flow (D), Hydraulic pressure (E) and the effective hydraulic power utilization for RO desalination compared with the theoretical maximum ($16/27$) wind power availability (F). The performance summary of the example under review in reference to wind farms comprising of 1, 4, 6 and 8 wind-pump units is furnished in TABLE 2 with respect to variable hydraulic flow at 60 bar expressed in terms of minimum and maximum pressurized flow rates ($m^3/h$), flow rates at average and nominal wind velocities as well as of daily average and annul average volumes ($m^3$) of SWRO permeates produced by such wind farm configurations. In additions, TABLE 2 also contains information concerning the annual average stored/used/saved clean hydraulic energy received from the wind farms described by the example under review.

The invention claimed is:

1. A system for continuous generation of rated electric power from a wind farm comprising:
    multitude of wind driven pump units; each comprising a rotor-driven pump through a shaft and a fixed ratio gearbox mechanism; with respective inlets and outlets of rotor-driven pumps connected in parallel to respective principle conduits of non-pressurized flow and pressurized flow; and a brake mechanism to stop rotor motion in case of high winds to avoid damage;
    multitude of hydraulic motors, or turbines, driven by pressurized hydraulic flow retrieved from said principle conduit of pressurized hydraulic flow through a valve means; with the respective inlets and outlets of said hydraulic motors, or turbines, connected in parallel to the respective principle conduits of non-pressurized flow and pressurized flow; with a shaft of each said hydraulic motor, or turbine, made to move at constant speed by a variable valve device which is actuated in response to monitored speed deviations of said shaft from a predetermined rated desired speed; and with conduits of non-pressurized hydraulic flow at the outlet of said hydraulic motors, or turbines, serving to recycle hydraulic flow back to the inlets said rotor-driven pumps of said wind-pump units through said principle conduit of non-pressurized flow;
    a valve means at an inlet and outlet of each wind driven pump to enable the temporary isolation of a specific wind-pump unit from the rest of the wind farm for maintenance and/or repair;
    a start up valve means to enable the initial build up of pressurized flow in said principle conduit of pressurized flow, with a minimum resistance to rotor motion, before such pressurized flow is diverted to the operation of said hydraulic motor(s), or turbine(s);
    one or more rated electric generators per each said hydraulic motor, or turbine, connected to said hydraulic motor, or turbine, by means of a gearbox of fixed ratio transmission and a clutch mechanism, whereby, said generators can be engaged, alternately or simultaneously, with the shaft of said hydraulic motor, or turbine, by a predetermined sequence as a function of wind power availability, thereby, enabling continuous generation of rated electric power over a wide wind regime;
    monitoring means of wind velocity and direction, hydraulic pressure and flow in hydraulic conduits; speed of hydraulic motors, turbines, rated electric power output of generators; and
    computer control means which determine the sequence of operations in the entire system whereby said hydraulic motor(s), or turbine(s), and rated generator(s) are actuated, alternately and/or simultaneously, to enable continuous rated electric power generation over a wide wind regime with high energy conversion efficiency due to attainment of rotor(s) speed(s) in the tip-speed-ratio range of high power coefficient.

2. A system for continuous generation of rated electric power from a wind farm according to claim 1 wherein:
    said rotor is a vertical rotor with fixed pitch angle blades for maximum capture of wind power, mounted on top of a structure elevated above ground level and made to follow wind direction by means of a wind tacking tail or by a motor driven tracking mechanism;
    said pump of wind-pump units of a positive displacement type with fixed geometric replacement per revolution, for pressurizing water or water solutions;
    said gearbox mechanism in rotor-driven pump units is of a selected fixed gear ratio transmission to enable said rotor to experience tip-speed-ratio of high power coefficient over a wide section of a wind regime, while speed of rotor is occasionally changed by the alternating and/or simultaneous actuation of said hydraulic, motor(s), or turbine(s), as a function of wind power availability; and
    said hydraulic flow of pressurized and non-pressurized feed comprising water or of water solutions or water mixtures with other solvents, including low freezing point solvents, such as glycols, for use in regions of cold climates.

3. A system, method and apparatus for continuous production of variable hydraulic feed flow of fixed desired pressure by a wind farm comprising:
    multitude of wind driven pump units; each comprising a rotor of fixed pitch blades for maximum capture of wind power, a brake mechanism to stop rotor motion in case of high winds to avoid damage; a rotor-driven pump of a positive displacement type with fixed geometric displacement; a gearbox mechanism of a variable ratio transmission connecting between a shaft of said rotor and said rotor-driven pump in said wind-pump units; with respective inlets and outlets in said rotor-driven pumps of wind-pumps units connected in parallel to respective principle conduits of non-pressurized flow and of pressurized flow;
    a variable valve means at the outlet of said principle conduit of pressurized flow, actuated in response to monitored pressure deviations from a fixed desired pressure in said principle conduit of pressurized flow, to enable the continuous production of variable hydraulic flow of fixed desired pressure as function of wind power availability;
    a valve means at an inlet and outlet of said rotor-driven pump of each wind-pump unit to enable temporary isolation of a specific wind-pump unit from the rest of the wind farm for maintenance and/or repair;
    monitoring means of wind velocity and direction, hydraulic pressure and flow in hydraulic conduits and of speed of rotor(s); and
    computer control means whereby gear ratio in said gearbox mechanism of said wind-pump units is adjusted as a function of wind velocity to enable attainment of high power coefficient tip-seed-ratio of rotors over a wide range wind regime, thereby, effecting high energy conversion efficiency of wind power to hydraulic power in the form of variable hydraulic flow of a fixed desired pressure.

4. A method according to claim 3 wherein feed at inlet to said principle conduit of non-pressurized conduit comprising a salt water solution, and whereas the flow of pressurized salt water solution at the outlet of said pressurized flow conduit used for desalination by reverse osmosis (RO) under a fixed desired pressure.

5. A method according to claim 3 wherein feed at inlet to said principle conduit of non-pressurized flow comprises potable water, and whereas the flow of pressurized potable water at the outlet of said pressurized conduit is admitted to a so-called Energy Recovery System, wherein, said flow of pressurized potable water applies to create a flow of pressurized salt water solution for desalination by reverse osmosis (RO) under the appropriate fixed desired pressure.

6. A method according to claim 3 wherein feed at inlet to said principle conduit of non-pressurized flow comprising a water solution that needs to be filtered, and whereas pressurized flow of said water solution that needs to be filtered at the outlet of said pressurized flow conduit applies to membrane filtration (Micro-, Ultra- and Nano-Filtration) under the fixed desired pressure.

7. A method according to claim 3 wherein feed at inlet to said principle conduit of non-pressurized flow is a water source that needs to be pressurized in supply lines for agricultural and/or domestic and/or industrial applications and/or needs to be elevated from a lower to an upper reservoir for the purpose of hydroelectric rated power generation.

* * * * *